MOLYBDENUM-TECHNETIUM SUPER-CONDUCTING COMPOSITION AND MAGNET

Filed April 10. 1961

INVENTOR
B.T. MATTHIAS
BY George S. Indig
ATTORNEY

United States Patent Office 3,157,830
Patented Nov. 17, 1964

3,157,830

MOLYBDENUM-TECHNETIUM SUPER-CONDUCTING COMPOSITION AND MAGNET

Bernd T. Matthias, Berkeley Heights, N.J., assignor to Bell Telephone Laboratories, Incorporated, New York, N.Y., a corporation of New York Filed Apr. 10, 1961, Ser. No. 101,954
6 Claims. (Cl. 317—158)

Figure 1:
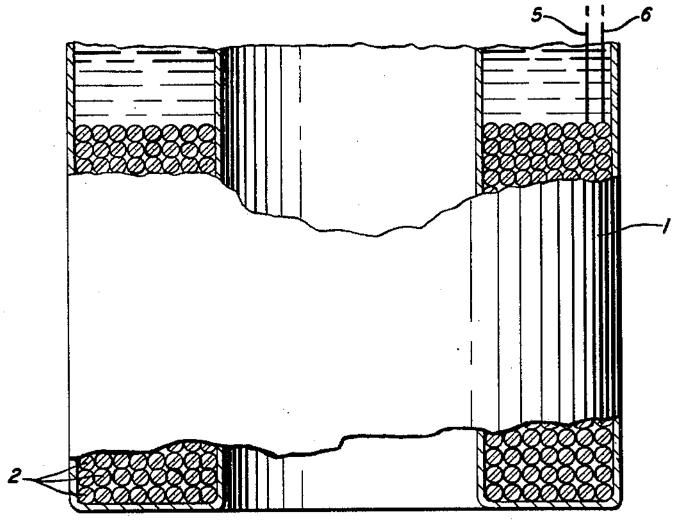

This invention relates to superconducting compositions of the molybdenum-technetium system and to devices including members of such compositions.

Although the phenomenon of superconductivity was discovered some fifty years ago, and although it was immediately apparent that the property was potentially important in, for example, the development of loss-free conductive systems and nondissipating magnetic configurations, the intervening years have seen little in the way of a practical realization. Although this was initially due, at least in part, to the difficulty and expense involved in maintaining superconducting materials at temperatures below their transition temperatures (not generally exceeding of the order of about 10 or 11 degrees Kelvin), this difficulty has largely been removed by new developments in low temperature apparatus.

Probably a more important limitation on the capabilities of superconducting structures is inherent in the material used. It was early recognized that the superconducting state was incompatible with critical maximum values of applied magnetic field, whether resulting from currents passing through the superconducting elements themselves or externally applied. Such field values, commonly designated $H_c$ (critical field), decrease for increasing current in the superconducting element and increase for decreasing temperature below the critical temperature, and generally have been found to range about maximum values of the order of about 2 to 4K gauss or less for most of the early materials, both elemental and alloy, on which such measurements were made. The maximum value of $H_c$ of course imposes an absolute maximum on the field intensity attainable by use of a given superconducting material regardless of configuration.

Recently, the discovery that $H_c$ for the allow system molybdenum-rhenium attains values as high as 15K gauss and higher has stimulated a revival of interest in practical devices operating on superconducting principles. Withing the past year, a superconducting solenoid containing a plurality of turns of Mo-Re was operated at an actual field of over 15K gauss (see 32 Journal of Applied Physics, 325–6).

From a fabrication standpoint, Mo-Re is an ideal material. It forms an almost perfect solid solution, is virtually strain-free as cast, and is so ductile as to be easily fabricated into wire or other configurations by conventional metallurgical cold-working. It has been recognized that this cold-working is further advantageous in that it improves the current-carrying capacity of the material. However, as important as this demonstration was, particularly from the communications standpoint, it is nevertheless true that fields of this magnitude are attained in conventional conductive solenoid structures without undue heat dissipation problems. The need for superconducting magnet configurations capable of delivering field intensities of the order of 50K gauss and higher, where the elimination of the heat dissipation problem encountered in conventional structures is serious, remained unsatisfied.

Very recently, it was discovered that the superconducting compound $Nb_3Sn$ is capable of withstanding applied fields of the order of 88K gauss and higher. Although extremely brittle and not readily subjected to ordinary metallurgical techniques for reducing cross-section, workers in the art have been apprised of a technique for satisfactorily forming wire-like configurations of this material. This technique may involve packing a containing tube with the elemental materials niobium and tin, working the tube and contents down to the desired size, forming the required configuration, and finally heat treating to react the elements and form the compound (see 6 Physical Review Letters, 89–91). This work has been universally recognized as an important contribution to the superconducting art, and devices constructed in accordance with these procedures will doubtless go into widespread use in the near future.

As valuable as the $Nb_3Sn$ techniques are, the fact remains that the fabricating procedures required are involved and are, in certain applications at least, justified only so long as a ductile material of equal capability is not introduced.

In accordance with this invention it has been discovered that alloys of the Mo-Tc system, while possessed of many of the excellent mechanical properties of materials of the Mo-Re system, evidence significantly larger values of $H_c$, sometimes approaching that value for the brittle material $Nb_3Sn$. Critical temperatures for certain of the materials of the compositional system exceed the maximum value observed for Mo-Re.

Figure 2:
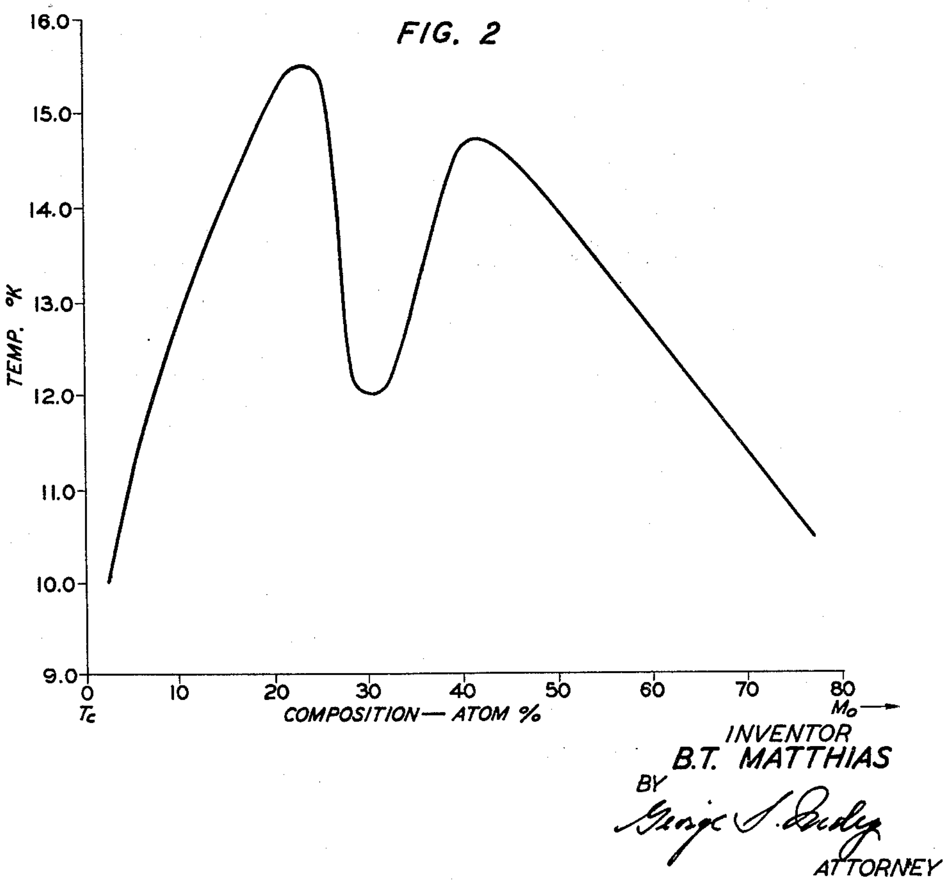

Discussion of the invention is facilitated by reference to the drawing, in which:

FIG. 1 is a sectional view of a magnet configuration consisting of an annular cryostat containing a plurality of windings of an alloy of the Mo-Tc system in accordance with this invention; and FIG 2, on coordinates of temperature in degrees Kelvin and composition in atomic percent, is a plot showing the relationship between critical temperature and composition for alloys of the Mo-Tc system.

As is discussed herein, the broad compositional range of Mo-Tc alloys, considered of significance in accordance with this invention, are those bounded by the compositions 5% Mo–95% Tc and 75% Mo–25% Tc, all expressed in atomic percent. Where reference is made to a material of the Mo-Tc system, or more succinctly to a Mo-Tc material, it is to be understood as referring to any of the compositions within this designated range. In conformity with the practice obtaining in the art, values of $T_c$, except where otherwise stated, refer to transition temperatures measured for zero applied field and zero current. Similarly, indicated values of $H_c$ correspond also with zero current. Certain of the techniques used for determining the superconducting properties of the concerned materials are set forth only briefly, it being recognized that the average worker skilled in the art is completely familiar with all such techniques. For a more complete treatise on the subject, including a detailed description of any of the procedures to which allusion is here had, attention is directed to "Superconductivity," by D. Shoenberg, Cambridge, 1960.

Referring more specifically to FIG. 1, there is shown an annular cryostat 1 of the approximate dimensions 18″ O.D. x 6″ I.D. x 30″ long, filled with liquid helium and containing 2000 turns per centimeter length of Mo-Tc windings 2. Terminal leads 5 and 6 are shown emerging from the coil. A pumping means, not shown, may be attached to the cryostat so as to permit a temperature variation, so resulting in a concomitant variation in boiling point of, for example, liquid helium for this pressure.

Variations in magnetic configurations using Mo-Tc materials may be made in accordance with established practice. For example, successive layers of windings may be connected in parallel so as to permit individual turns to operate at field values more nearly approaching the characteristic value of $H_c$ for the material. Here, as with other superconducting configurations, it may be desirable to insulate successive windings by thin coatings of any of the ductile materials gold, silver, and copper, which may be drawn down together with the initial Mo-Tc body (see 32 Journal of Applied Physics, 325–6).

The readings plotted on FIG. 2 were determined by the standard flux exclusion method utilizing measurements made with a ballistic galvanometer across a pair of secondary coils electrically connected in series opposition, both contained within primary coils. In accordance with this method, the sample is placed within one of the coils and the primary is pulsed with a make-break circuit, for example at 6 volts and 10 milliamperes. An individual primary coil with an air core or containing any non-superconducting material evidences a varying induced voltage with time due to penetration of flux. A coil containing a superconducting material evidences no such change insofar as flux is excluded by the superconductor. A non-zero galvanometer reading in a given direction is obtained when the sample placed within one of the secondaries is superconducting. The particular galvanometer used was such that it integrated over a period of approximately a second, an interval adequate to ensure complete penetration of any nonsuperconducting material contained within a secondary coil. Such readings were repeated for each of approximately twelve samples at successively higher temperatures and a zero reading was obtained, so indicating complete flux penetration and breakdown of the superconducting state.

It is seen from FIG. 2 that alloys of the Mo-Tc system evidence critical temperatures well above those of the elements Tc (about 9.3 degrees Kelvin) and Mo (hypothetically about −13 degrees Kelvin for the cubic material, a temperature which does not exist in nature). The broad range of from 5% Mo–95% Tc to 75% Mo–25% Tc, the compositional limits placed on the Mo-Tc system for the purposes of this invention, may be justified on the basis of the critical temperatures evidenced by this range. A preferred compositional range is limited by the compositions 7% Mo–93% Tc and 67.5% Mo–32.5% Tc, corresponding with the low and high compositions corresponding with the 12 degree Kelvin critical temperatures indicated on the figure. A still more preferred range is between 40% Mo–60% Tc and 67.5% Mo–32.5% Tc, all expressed in atomic percent. The limit of 40% Mo is occasioned by the observation of a phase transformation below this composition and extending to or below the 30% Mo point. This phase probably corresponds to the sigma region observed in the Mo-Re system. Although materials of the sigma phase are useful, their characteristics are such that they are not readily amenable to some of the usual metallurgical techniques. Of more significance, however, is the fact that these materials have been shown to be capable of withstanding fields of at least 84 K gauss, as based on bulk samples. Actual values of $H_c$, since dependent upon the relatively small fraction of material last evidencing superconductivity, are of course higher. A two-fold increase in the value of $H_c$ is realized for mechanical cold-working for reductions of the order of 90 percent and greater where such reduction is defined as:

$$\frac{\text{Original cross-sectional area} - \text{final cross-sectional area}}{\text{Original cross-sectional area}} \times 100\%$$

In interpreting the data of FIG. 2 it should be stressed that the indicated values are conservative. Although accurate for the materials tested, increase in the value of $T_c$ is obtained under various conditions in common with other superconducting systems as, for example, Mo-Re. Values of $H_c$ for the bulk materials as discussed above have been calculated in conventional manner from the usual heat capacity measurements. The relationship between heat capacity and $H_c$ is:

$$\Delta C = C_s - C_n = \frac{VT}{4\pi} H_c \frac{d^2H_c}{dT^2} + \frac{VT}{4\pi}\left(\frac{dH_c}{dT}\right)^2$$

where $\Delta C$=change in specific heat,
$C_s$=superconducting: specific heat,
$C_n$=normal: specific heat,
$V$=volume,
$T$=absolute temperature,
$H_c$=critical field, all in CGS units.

An approximate relationship between $H_c$ and critical temperature for a "soft" superconductor is:

$$H_c = H_0(1-(T/T_c)^2)$$

where $H_c$=critical field,
$H_0$=critical field at absolute zero,
$T$=absolute temperature,
$T_c$=critical temperature, all in CGS units.

Of course, with any degree of working, the properties of the material deviate from those of a "soft" superconductor (current flow is exclusively through a thin shell of a thickness equal to the penetration depth) and approach those of a "hard" superconductor (flow is largely filamentary). The number of filaments per unit of cross-sectional area for a given degree of working has been found to be reproducible independent of cross section. Working of course results in a larger fraction of superconducting material, so that bulk measurements made on such samples evidence higher values of $H_c$ than those indicated.

Although the method for measuring heat capacity and heat capacity change is more fully described elsewhere, it is briefly set forth below:

The sample is thermally insulated, then a known amount of heat is delivered to it and the rise in temperature is observed. This gives the specific heat directly, which at the superconducting transition temperature shows a pronounced anomaly, thus indicating the transition of the bulk material.

Since alloys of the Mo-Tc system are not readily available at this time, the technique here used for preparing samples is outlined below. Although this procedure is suitable for the preparation of relatively small samples, obvious variations are deemed advisable where larger quantities are desired.

The desired quantities of elemental materials are weighed out and melted in a button-welding inert arc furnace. The apparatus used consists of a water-cooled copper hearth with a ¾ inch diameter hemispherical cavity. The cavity, together with contents, acts as a first electrode. A second, nondisposable electrode, also water-cooled, made for example of tungsten, is spaced from the surface of the contents of the cavity (¼ inch was found suitable), an arc is struck using high-frequency current (0.5 megacycle or greater) and is maintained with a direct-current potential sufficient to bring about melting. For a 10-gram total charge, a 40-volt potential at a spacing of ¼ inch resulted in a current of about 300 amperes, which is sufficient to bring about melting in a period of about 10 to 15 seconds. Since melting is prevented at the interface between the contents and water-cooled crucible, homogenization is brought about only by turning over the charge and repeating the procedure several times. Five or six repetitions were found adequate in the experiments run.

The invention has, of necessity, been described in terms of a limited number of embodiments. Certain variations are apparent and are considered to be within the scope of the invention. For example, although description has been largely in terms of wire magnet configurations, other magnet configurations are feasible, as are other devices which may depend on the excellent current-carrying properties of the material, as well as its excellent value of $H_c$. Also, whereas description has been in terms of the pure system Mo-Tc, it may be deemed advantageous to add to the alloying materials to obtain a desired change in a given characteristics. Accordingly, alloys of the Mo-Tc materials with other superconducting elements or compositions as, for example, materials of the Mo-Re system, are contemplated.

What is claimed is:

1. A superconducting composition comprising an alloy of from 5 to 75 atomic percent Mo and from 95 to 25 atomic percent Tc.

2. A superconducting composition comprising an alloy of from 7 to 67.5 atomic percent Mo and from 93 to 32.5 atomic percent Tc.

3. A superconducting composition comprising an alloy of from 40 to 67.5 atomic percent Mo and from 60 to 32.5 atomic percent Tc.

4. A superconducting magnet comprising a plurality of turns of an alloy of the Mo-Tc system comprising from 5 to 75 atomic percent Mo and from 95 to 25 atomic percent Tc, together with means for maintaining the said turns at a temperature in a range limited by a maximum value equal to the critical temperature for the said alloy.

5. A superconducting magnet comprising a plurality of turns of an alloy of the Mo-Tc system comprising from 7 to 67.5 atomic percent Mo and from 93 to 32.5 atomic percent Tc, together with means for maintaining the said turns at a temperature in a range limited by a maximum value equal to the critical temperature for the said alloy.

6. A superconducting magnet comprising a plurality of turns of an alloy of the Mo-Tc system comprising from 40 to 67.5 atomic percent Mo and from 60 to 32.5 atomic percent Tc, together with means for maintaining the said turns at a temperature in a range limited by a maximum value equal to the critical temperature for the said alloy.

References Cited in the file of this patent

UNITED STATES PATENTS

| | | |
|---|---|---|
| 2,857,268 | Cleary | Oct. 21, 1958 |
| 3,098,181 | Cioffi | July 16, 1963 |

OTHER REFERENCES

Autler: "Superconducting Electromagnets," The Review of Scientific Instruments, vol. 31, No. 9, April 1960, pp. 369–373.

Klopp et al.: "Further Studies of Rhenium Alloying Effects in Molybdenum, Tungsten and Chromium," Battelle Memorial Institute, July 1960, 32 pages.

Burton: "Superconductivity," The University of Toronto Press, Toronto, Canada, 1934, pp. 53 to 58.

Von M. V. Laue: "Supraleitung und Kristallklasse," Annalen der Physik, 6 Folge, Band 3, pp. 40–42, 1948.